(12) United States Patent
Ortner et al.

(10) Patent No.: US 7,644,025 B2
(45) Date of Patent: Jan. 5, 2010

(54) METHOD AND SYSTEM FOR PROVIDING MANDATORILY CONVERTIBLE SECURITIES WITH AN ASSOCIATED CALL SPREAD AGAINST A TRUST

(75) Inventors: William Ortner, New York, NY (US); Alan Rifkin, New York, NY (US); Craig Farr, New York, NY (US)

(73) Assignee: Citigroup Global Markets, Inc., New York, NY (US)

( * ) Notice: Subject to any disclaimer, the term of this patent is extended or adjusted under 35 U.S.C. 154(b) by 1163 days.

(21) Appl. No.: 10/628,208

(22) Filed: Jul. 29, 2003

(65) Prior Publication Data

US 2005/0027630 A1    Feb. 3, 2005

(51) Int. Cl.
*G06Q 40/00* (2006.01)
(52) U.S. Cl. ......................................................... 705/36
(58) Field of Classification Search ..................... 705/36
See application file for complete search history.

(56) References Cited

U.S. PATENT DOCUMENTS

2003/0225656 A1* 12/2003 Aberman et al. .............. 705/36

OTHER PUBLICATIONS

Bodie, ZVi; Kane, Alex; Marcus, Alan J. Investments. 4th Edition. Irwin McGraw-Hill. 1999. pp. 72-81, 102-106, 181-186, 611-614, 626-638, 858-859.*

* cited by examiner

*Primary Examiner*—James A. Kramer
*Assistant Examiner*—Jason M Borlinghaus
(74) *Attorney, Agent, or Firm*—King & Spalding LLP

(57) ABSTRACT

The present invention relates to a method and system for offering a novel mandatorily convertible securities (e.g., DECS) by using a third party entity (either a corporate entity or a newly-formed independent trust) to: 1) issue and sell novel DECS to market investors; 2) obtain from a first entity shares of common stock in a second entity, or rights to receive such shares in the future, to satisfy the mandatory conversion requirement of the DECS; 3) sell or retain the rights to any residual value obtained after satisfying the obligation to DECS investors; and 4) use the proceeds from such sale or retained value to fund a portion of the DECS coupon. As compared to a traditional DECS, the use of the third party intermediary allows the first entity to: 1) recognize an accounting gain/loss on its underlying position in the second entity up front on the day of sale of the novel DECS; 2) avoid the creation of debt on the balance sheet of the first entity; 3) avoid any mark-to-market through the income statement each fiscal quarter, which would produce income statement volatility.

8 Claims, 6 Drawing Sheets

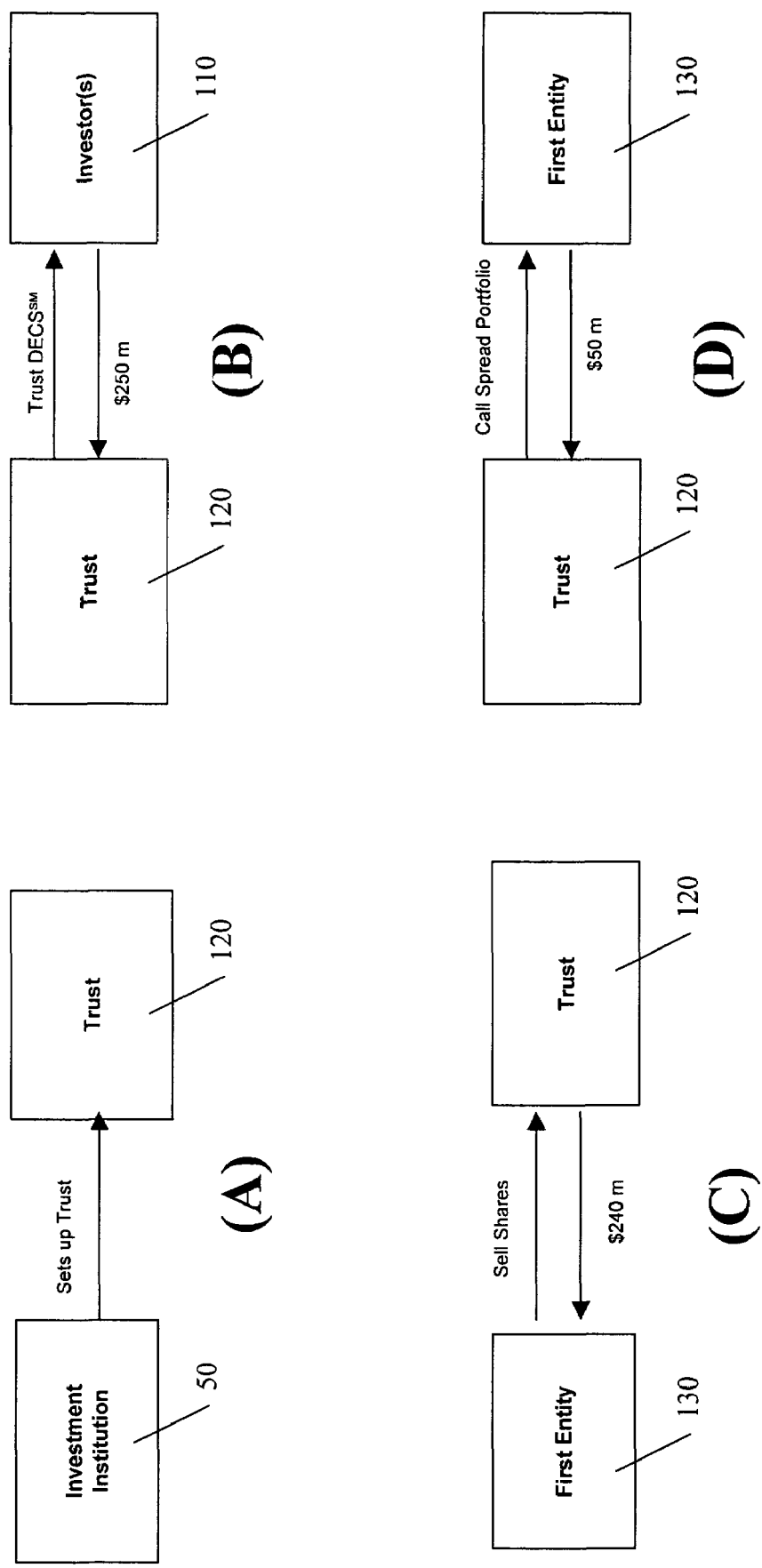
FIGs. 2A-D

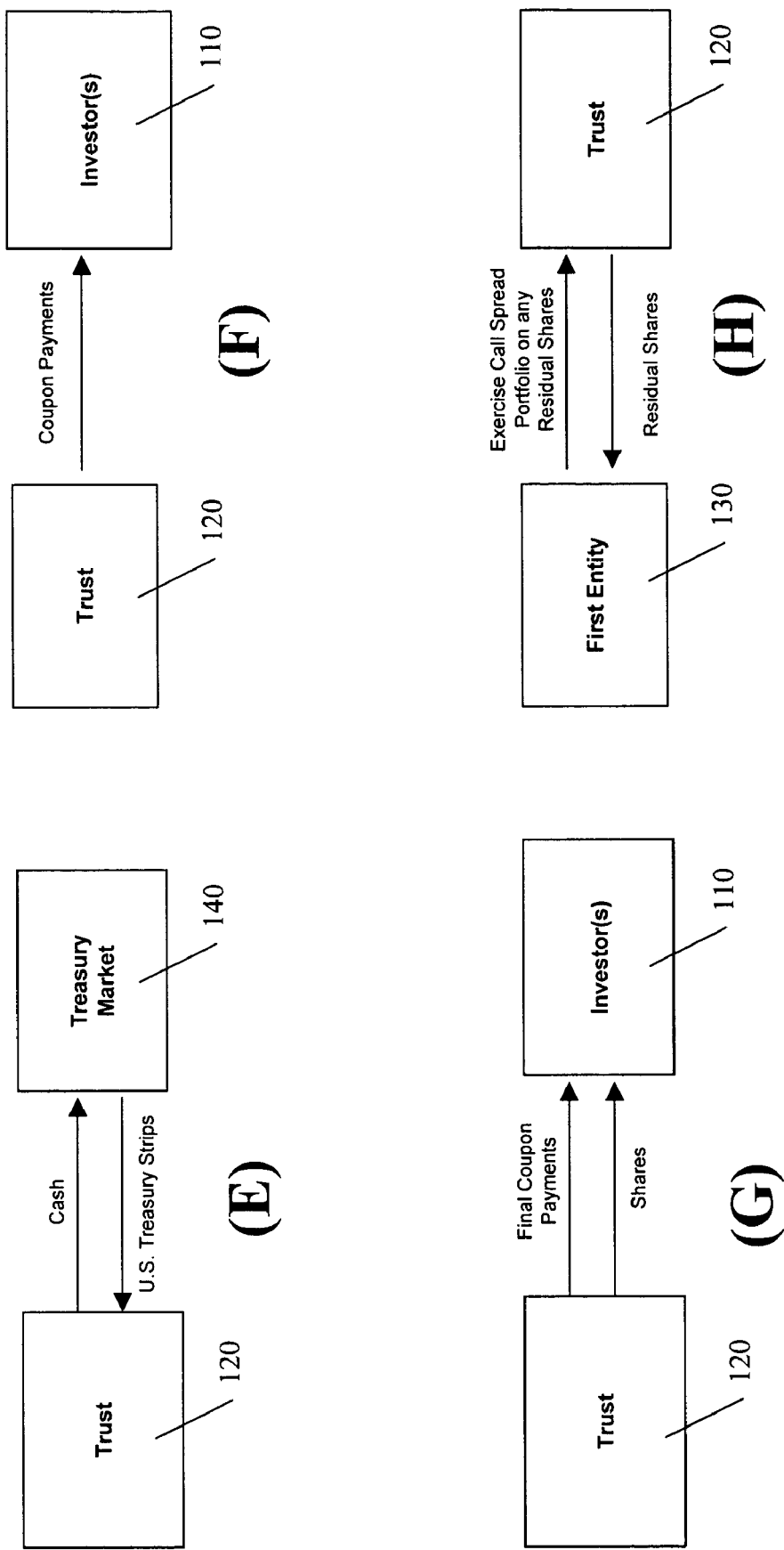
FIGs. 2E-H

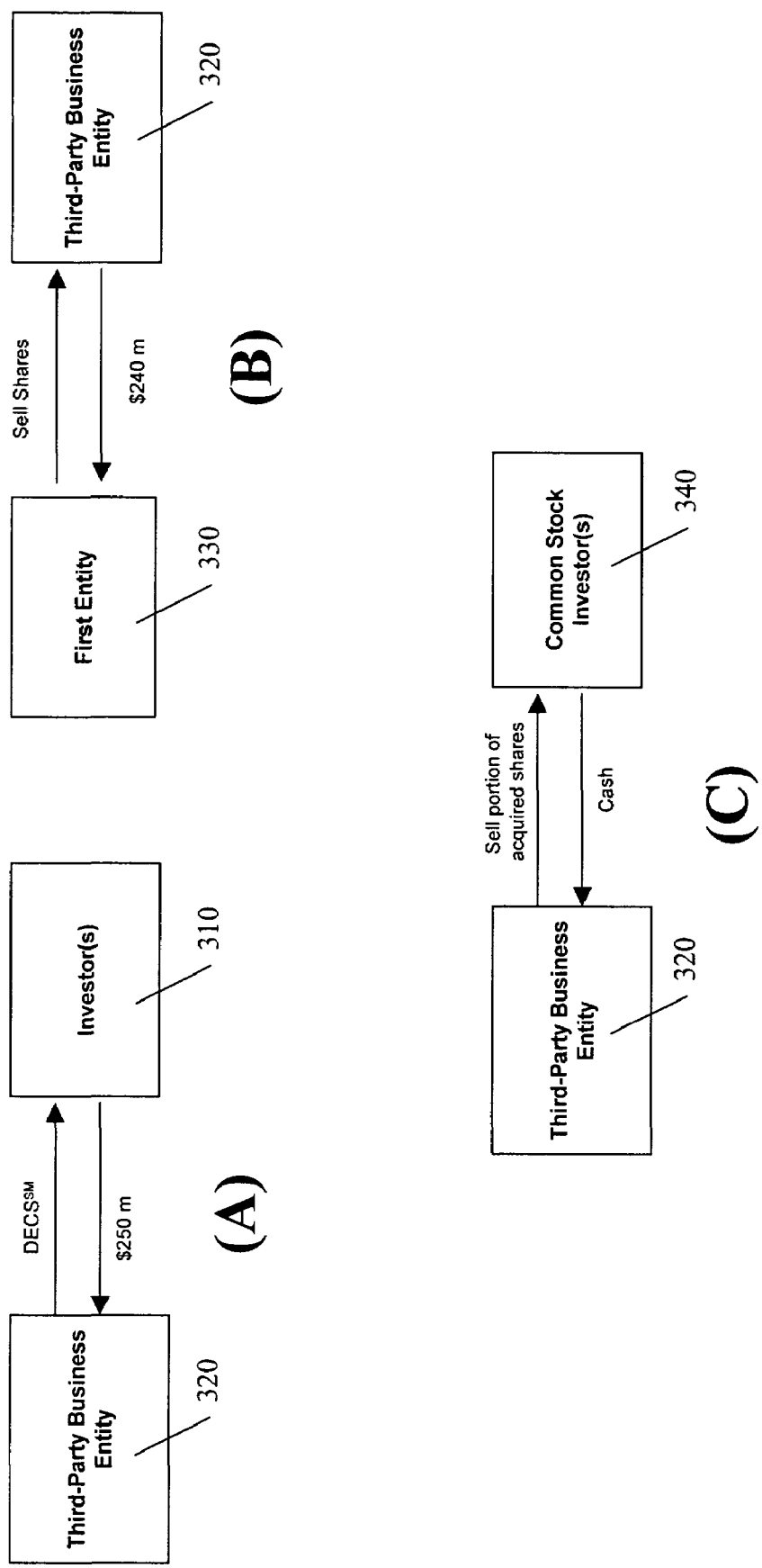
FIGs. 4A-C

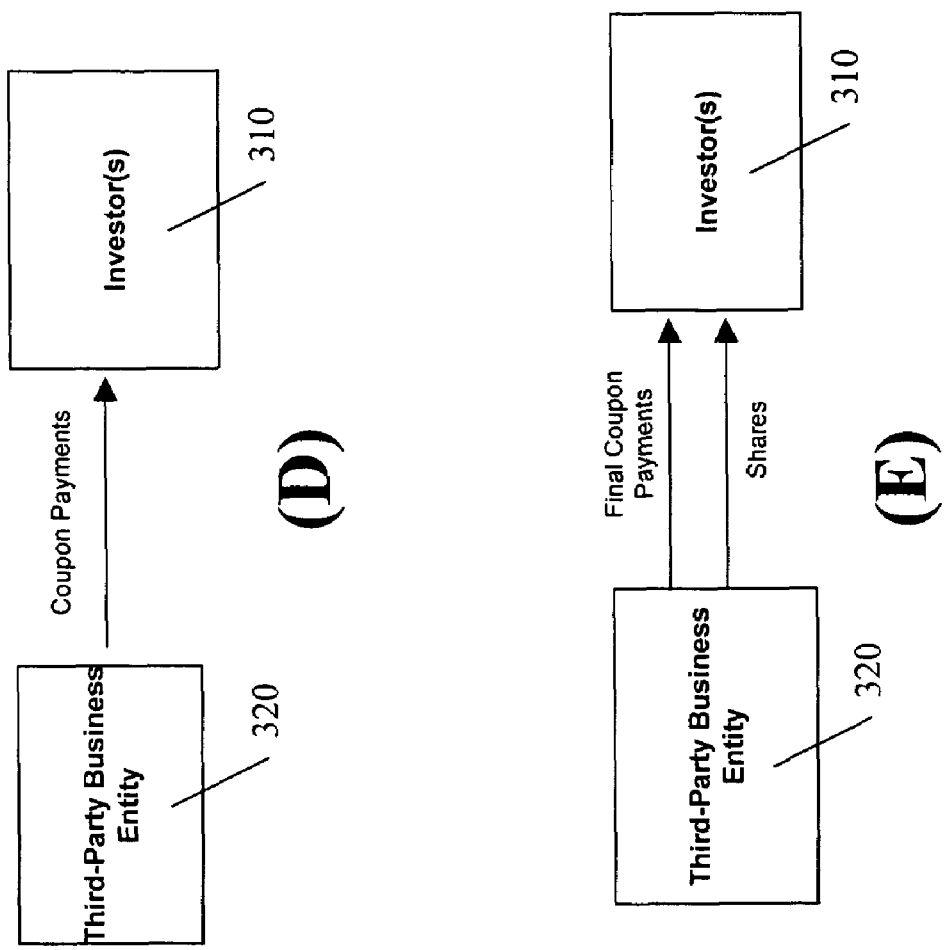
FIGs. 4D-E

METHOD AND SYSTEM FOR PROVIDING MANDATORILY CONVERTIBLE SECURITIES WITH AN ASSOCIATED CALL SPREAD AGAINST A TRUST

BACKGROUND OF THE INVENTION

1. Field of the Invention

The present invention relates to the field of structured financial products. More particularly, the present invention relates to a method and system for offering mandatorily convertible securities, such as Debt Exchangeable for Common Stock (DECS$^{SM}$), with an associated call spread.

2. Background

As known in the art, structured financial products are financial instruments that are designed and created by investment institutions for business entities (e.g., corporations) to issue and sell to investors for specific capital-raising activities. In turn, investors purchase structured financial products, focusing on payoff patterns (i.e., capital appreciation and/or current income) of the products, to address their specific investment objectives. As referred herein, an investor can be an individual, a group of individuals, an organization, or a business entity.

One of the many structured financial products in existence today is the conventional DECS (mandatory convertible). As understood in the art, a DECS is typically a preferred security, issued by a business entity paying a cash distribution (i.e., coupon), with a mandatory conversion into shares of common stock at a specified future time and based on a specified conversion price. The DECS conversion feature typically works as follows:

1) if the common stock price on the mandatory conversion date is at or below the common stock price on the issuance date, each DECS will convert into a fixed number of common stock equal to:

> Face Amount of DECS/Common Stock Price on Issuance Date;

2) if the common stock price on the mandatory conversion date is above the common stock price on the issuance date but below the conversion price, each DECS will convert into a variable number of common stock equal to:

> Face amount of DECS/Common Stock Price on Mandatory Conversion Date;

Or 3) if the common stock price on the mandatory conversion date is at or above the conversion price, each DECS will convert into a fixed number of common stock equal to:

> Face amount of DECS/Conversion Price.

Business entities see DECS as an attractive means of raising primary equity capital (from the credit rating agencies' perspective) while retaining a certain amount of potential appreciation in its common stock (through the delivery to the investors of fewer shares upon conversion if the stock has performed well).

A business entity holding a significant equity stake in another business entity also sees DECS as an attractive means of disposing of its cross-shareholding at a price no less than the current market price, while retaining a certain amount of potential appreciation in the common stock of that business entity. For instance, Company ABC holding a significant equity position in Company XYZ can monetize a portion of that position by issuing DECS that are mandatorily exchangeable to a certain number of shares of XYZ's common stock. The DECS would ensure the effective sale in the future by Company ABC of its XYZ stock at a price no less than the current price, while enabling ABC to capture potential appreciation in XYZ's stock price in the future. Many business entities use DECS as a portion of an overall disposition strategy, which is part outright common stock sales and part DECS, because DECS appeal to different investors than common stock, thereby reducing the common stock price impact of the overall transaction as compared to a solely common-stock offering.

SUMMARY OF THE INVENTION

The conventional DECS structure presents a number of disadvantages when used to dispose of a cross-shareholding. First, the DECS issuer, which is Company ABC in the above example, must pay out coupons on the issued DECS until the mandatory conversion date. Second, Company ABC cannot immediately recognize an accounting gain/loss on its underlying XYZ's position because it will not deliver the XYZ shares for the DECS mandatory conversion until a specified future time. Third, a standard DECS structure creates debt on the balance sheet of Company ABC until the mandatory conversion date. Fourth, for some issuers the standard DECS must be marked-to-market through the income statement each fiscal quarter, producing income statement volatility. Fifth, while Company ABC might otherwise desire to effect its desired sale of XYZ outright, market conditions may make such a sale difficult to achieve or such a sale would have a greater impact on XYZ's price. In other words, a disposal of a portion of the position in the equity-linked market could produce higher proceeds to Company ABC than an outright sale of the entire position.

Hence, the preferred embodiments of the present invention seek to modify the conventional DECS by providing a system and method for establishing an independent trust to issue a novel DECS structure that includes a mandatorily exchangeable security tied to a first entity's equity holding in a second entity such that the first entity can: 1) recognize an accounting gain/loss on its underlying position in the second entity up front on the day of sale of the novel DECS; 2) receive some of the upside appreciation of the cross-shared entity's common stock up to the DECS maturity; and 3) avoid the creation of debt on the balance sheet.

The preferred embodiments of the present invention also provide a system and method for offering a novel DECS, called SynDECS™, wherein a third party intermediary (e.g., a business entity): 1) issues and sells novel DECS to public market investors; 2) obtains from a first entity (Company ABC) shares of common stock of a second entity (Company XYZ), or rights to receive such shares in the future, to satisfy the mandatory conversion requirement of the DECS; 3) sells or retains the rights to any residual value obtained after satisfying the obligation to DECS investors; and 4) uses the proceeds from such sale or retained value to fund a portion of the DECS coupon. As compared to a conventional DECS, the use of the third party intermediary allows the first entity to: 1) recognize an accounting gain/loss on its underlying position in the second entity up front on the day of sale of the novel DECS; 2) avoid the creation of debt on the balance sheet of the first entity; 3) avoid any mark-to-market through the income statement each fiscal quarter, which would produce income statement volatility.

BRIEF DESCRIPTION OF THE DRAWINGS

The preferred embodiments of the present invention are illustrated by way of example and not limited to the following figures and appendices, in which:

FIGS. 2A-H depict a breakdown of the elements shown in FIG. 1, in accordance with an embodiment of the present invention.

FIGS. 4A-E depict a breakdown of the elements shown in FIG. 3, in accordance with a second embodiment of the present invention.

DETAILED DESCRIPTION OF THE INVENTION

Reference is now made in detail to the preferred embodiments of the present invention, illustrative examples of which are illustrated in the accompanying drawings, showing methods and systems for a novel DECS with an associated call spread retained by the original selling shareholder(s) through an established independent trust and alternatively retained by a third-party intermediary.

Figure 1:
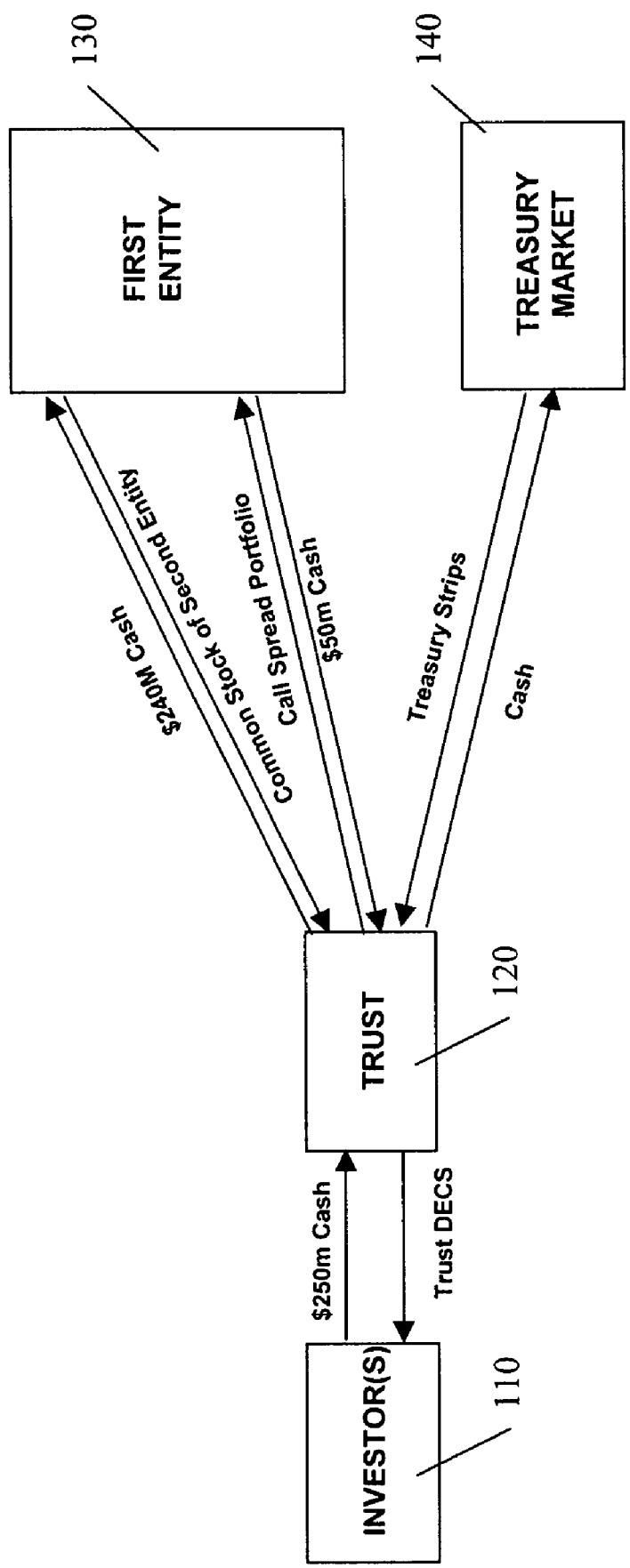
FIG. 1 depicts a structural overview of the novel DECS in accordance with an embodiment of the present invention.

FIG. 1 shows an example of an almagamated structural diagram of the novel DECS using an established independent trust, in accordance with an embodiment of the present invention. Here, a first entity 130 having an equity position (i.e., owns shares of common stock) in a second entity (not shown in the figure) can take advantage of the novel DECS to recognize an accounting gain/loss on the underlying position in the second entity up front on the day of the sale of the DECS, receive some of the upside appreciation of the second entity's common stock during the life of an established independent trust, dispose of the equity stake for legal and accounting purposes and allow the first entity access to a strong equity-linked convertible market. Following the example mentioned earlier, the first entity can be Company ABC with cross-shareholdings in the second entity, Company XYZ. It should be noted that the first entity 130 can be any individual, organization, or group that is a shareholder of the second entity.

FIG. 1 is now described with reference to FIGS. 2A-H, which provide a breakdown of the elements in FIG. 1, wherein like elements are shown with like label numbers. First, as shown in FIG. 2A, a trust 120 is established independently from the first entity 130, the second entity mentioned above, and the market investors 110 prior to any issuance of the novel DECS of the present invention. The trust 120 can be established by the first entity 130, by an investment institution 50 for the first entity 130, or by any other party. According to an embodiment of the present invention, the trust can be any business trust registrable as a non-diversified closed-end management investment company under the U.S. Investment Company Act of 1940. In addition, the trust can be created as a Grantor Trust for U.S. federal income tax purposes. In FIG. 2B, the trust 120 then issues and sells the novel Trust DECS to market investor(s) 110 on the issue date. The example in FIGS. 1 and 2 shows that the investor(s) pays $250 million for the issued Trust DECS. The trust 120 pays a current rate of return for each issued Trust DECS. At maturity of the Trust DECS, the trust will deliver a certain number of shares of the second entity's common stock owned by the first entity (for mandatory conversion) to the investor(s) 110 who is the Trust DECS holder in accordance with the conventional DECS payout formula mentioned earlier.

In FIG. 2C, on the issue date the trust 120 uses the $250 million proceeds from the Trust DECS sale to acquire shares of the second entity's common stock from the first entity in order to satisfy the aforementioned mandatory conversion requirement. This allows the first entity 120 to recognize any accounting gain/loss on its underlying position in the second entity up front on the day of sale of the Trust DECS. It should be noted that a portion of the $250 million proceeds is used for transactional costs typically associated with setting up DECS (thus, e.g., FIG. 2C shows that only $240 million worth of shares are purchased by the trust).

In FIG. 2D, in addition to issuing the Trust DECS on the issue date, the trust 120 sells to the first entity 130 a call spread that allows the first entity 130 to receive from the trust 120 any shares of the second entity's common stock not required to be delivered to the investor(s) 110 as the Trust DECS holder at maturity. This happens when the second entity's common stock price outperforms during the life of the trust 120. The example in FIGS. 1 and 2 show that the first entity 130 pays $50 million for the call spread. For instance, the call spread that the first entity 130 purchased allows the first entity 130 to retain a certain percentage of the initial upside (e.g., 20% appreciation of the second entity's common stock) and/or any residual upside interest thereafter. Hence, the first entity 130 can potentially keep any upside appreciation in its investment into the second entity's common stock up to the DECS maturity even though it may no longer be the shareholder of such stock.

In FIG. 2E, the trust 120 then uses a portion of the proceeds from the call spread sale to purchase a portfolio of U.S. Treasury strips from the U.S. Treasury Market 140. In FIG. 2F, the trust 120 will use the proceeds from the U.S. Treasury strips maturing each quarter to provide coupon payments to the investor(s) 110 as the Trust DECS holder for that quarter. It should be noted that any types of securities can be purchased so long as they can appeal to the investor(s) 110 and satisfy the coupon payments to such investor(s). In FIG. 2G, at maturity of the Trust DECS, the trust 120 delivers the final coupon payment and share(s) of the second entity's common stock to the investor(s) 110 in accordance with the mandatory conversion requirement mentioned earlier. In FIG. 2H, also at maturity of the Trust DECS, the first entity 130 can exercise its previously-purchased call spread on any residual shares of the second entity's common stock that are still held by the trust 120. Hence, as mentioned earlier, the first entity can receive some of the upside appreciation of the second entity's common stock during the life of the trust 120, and the Trust DECS allows the first entity 130 access to an equity-linked convertible market. The call spread also can be purchased or retained by the investment institution 50 or any party other than the first entity 130 in order to receive some of the upside appreciation of the second entity's common stock during the life of the trust 120, as described next.

Figure 3:
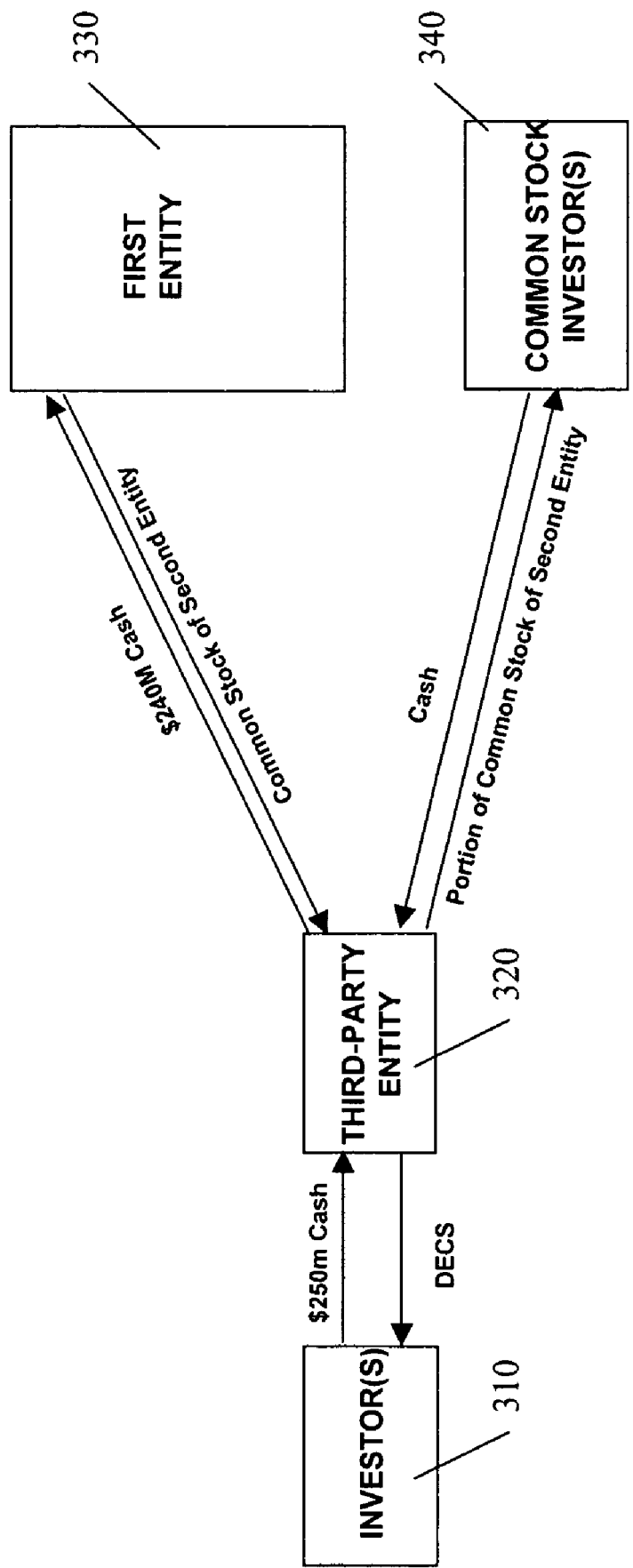
FIG. 3 depicts a structural overview of the novel DECS in accordance with a second embodiment of the present invention.

FIG. 3 shows an example of an almagamated structural diagram of the novel DECS using a separate business entity 320 as a third-party intermediary in lieu of an independent trust, in accordance with an embodiment of the present invention. Here, a first entity 330 having an equity position (i.e., owns shares of common stock) in a second entity (not shown in the figure) can also take advantage of the novel DECS to recognize an accounting gain/loss on the underlying position in the second entity up front on the day of the sale of the DECS and dispose of the equity stake for legal and accounting purposes. In this embodiment, the third party business entity 320 stands to receive some of the upside appreciation of the second entity's common stock while bearing market risks associated with the out-right purchasing of the first entity's shares of the second entity's stock. As mentioned earlier, the first entity can be Company ABC with cross-shareholdings in the second entity, Company XYZ. Again, it should be noted that the first entity 130 can be any individual, organization, or group that is a shareholder of the second entity.

FIG. 3 is now described with reference to FIGS. 4A-E, which provide a breakdown of the elements in FIG. 1, wherein like elements are shown with like label numbers. First, as shown in FIG. 4A, the third-party business entity 320 issues and sells the novel DECS to market investor(s) 310 on the issue date. The example in FIGS. 3 and 4 shows that the investor(s) pays $250 million for the issued DECS. The third-party entity 320 pays a current rate of return for each issued DECS. At maturity of the DECS, the third-party entity 320 will deliver a certain number of shares of the second entity's common stock owned by the first entity (for mandatory conversion) to the investor(s) 310 who is the DECS holder in accordance with the conventional DECS payout formula mentioned earlier.

In FIG. 4B, on the issue date the third-party entity 320 also uses the $250 million proceeds from the DECS sale to acquire shares of the second entity's common stock from the first entity in order to satisfy the aforementioned mandatory conversion requirement. This allows the first entity 320 to recognize any accounting gain/loss on its underlying position in the second entity up front on the day of sale of the Trust DECS. As mentioned earlier, a portion of the $250 million proceeds is used for transactional costs typically associated with setting up DECS (thus, e.g., FIG. 2C shows that only $240 million worth of shares are purchased by the third-party entity 320).

In FIG. 4C, instead of selling to the first entity a call spread as provided in the previous embodiment involving an established independent trust, the third-party entity 320 effectively retains the call spread by purchasing shares from the first entity 330 and selling DECS with variable payouts of such shares to the investor(s) 310. Because the third-party entity 320 out right purchases shares of second entity's common stock from the first entity 330, the third-party entity 320 also acquires market risks associated with such purchase. The third-party entity 320 can hedge a portion of such risks by short selling a portion of the acquired shares of common stock to common stock investor(s) 340. By retaining some shares of the acquired common stock, the third-party entity 320 can keep any appreciation in its investment of such shares.

In FIG. 4D, because the third-party entity 320 issue the DECS to the investor(s) 310, it is responsible for providing coupon payments to such investor(s). In FIG. 4E, at maturity of the DECS, the third-party entity 320 delivers the final coupon payment and share(s) of the acquired common stock to the investor(s) 310 in accordance with the mandatory conversion requirement mentioned earlier.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

The invention claimed is:

1. A computer-implemented method for offering a structured financial product, comprising:
    establishing an independent trust;
    the trust issuing, by a computer, mandatorily convertible securities with associated cash distribution;
    the trust receiving, by the computer, first proceeds from the issuance of the mandatorily convertible securities;
    the trust purchasing, by the computer, shares of common stock with the first proceeds;
    the trust issuing, by the computer, a call spread portfolio on the purchased shares of common stock;
    the trust receiving, by the computer, second proceeds from the issuance of the call spread portfolio; and
    the trust retaining, by the computer, sufficient funds to pay out the associated cash distribution.

2. The method of claim 1, wherein the step of the trust retaining the sufficient funds includes: the trust retaining the sufficient funds by purchasing governmental treasury securities with the second proceeds.

3. The method of claim 1, wherein the step of the trust retaining the sufficient funds includes: the trust retaining the sufficient funds by purchasing securities of the issued mandatorily convertible securities.

4. The method of claim 1, wherein the step of the trust purchasing shares of common stock includes: the trust purchasing from a first entity the shares of common stock of a second entity.

5. The method of claim 4, wherein the call spread portfolio is issued by the trust to the first entity, and the second proceeds are received by the trust from the first entity.

6. The method of claim 1, wherein the trust is registrable as a closed-end investment entity under the U.S. Investment Company Act of 1940.

7. The method of claim 1, wherein the trust is a Grantor Trust.

8. The method of claim 1, wherein the shares of common stock are purchased by the trust to cover a mandatory conversion of the issued mandatorily convertible securities.

\* \* \* \* \*

UNITED STATES PATENT AND TRADEMARK OFFICE
CERTIFICATE OF CORRECTION

PATENT NO. : 7,644,025 B2
APPLICATION NO. : 10/628208
DATED : January 5, 2010
INVENTOR(S) : Ortner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1831 days.

Signed and Sealed this

Twenty-first Day of December, 2010

David J. Kappos
*Director of the United States Patent and Trademark Office*